US012789753B2

(12) United States Patent
Etemadi et al.

(10) Patent No.: US 12,789,753 B2
(45) Date of Patent: Nov. 10, 2026

(54) WINDSHIELD WIPERS

(71) Applicant: PACCAR Inc, Bellevue, WA (US)

(72) Inventors: Christopher Etemadi, Corinth, TX (US); Preston Godinich, Denton, TX (US)

(73) Assignee: PACCAR INC, Bellevue, WA (US)

(*) Notice: Subject to any disclaimer, the term of this patent is extended or adjusted under 35 U.S.C. 154(b) by 450 days.

(21) Appl. No.: 18/494,626

(22) Filed: Oct. 25, 2023

(65) Prior Publication Data

US 2025/0136053 A1 May 1, 2025

(51) Int. Cl.
*B60S 1/34* (2006.01)
*B60S 1/28* (2006.01)

(52) U.S. Cl.
CPC ............... *B60S 1/3406* (2013.01); *B60S 1/28* (2013.01)

(58) Field of Classification Search
CPC .. B60S 1/3406; B60S 1/28; B60S 1/34; B60S 1/3402; B60S 1/3409; B60S 1/3425; B60S 1/3429
See application file for complete search history.

(56) References Cited

U.S. PATENT DOCUMENTS

| | | | | |
|---|---|---|---|---|
| 2,691,186 | A | 10/1954 | Oishei et al. | |
| 2,827,653 | A | 3/1958 | Dyer et al. | |
| 2,948,010 | A | 8/1960 | Oishei et al. | |
| 3,292,200 | A | 12/1966 | Scinta | |
| 5,538,309 | A * | 7/1996 | Murray | B60J 5/0473 296/64 |
| 5,857,236 | A | 1/1999 | Sakurai et al. | |
| 6,374,451 | B1 | 4/2002 | Kalbas et al. | |
| 7,552,502 | B2 * | 6/2009 | Kagawa | B60S 1/3436 15/250.31 |
| 8,028,367 | B2 | 10/2011 | Makihara et al. | |
| 9,493,139 | B2 * | 11/2016 | Iwazaki | B60S 1/34 |
| 11,364,878 | B2 * | 6/2022 | Zielinski | B60S 1/0452 |
| 2008/0216868 | A1 * | 9/2008 | Karcher | B60S 1/08 318/443 |
| 2012/0260939 | A1 | 10/2012 | Jeuffe et al. | |
| 2019/0337486 | A1 * | 11/2019 | Sugimoto | B60S 1/36 |
| 2020/0391699 | A1 | 12/2020 | Srinivas et al. | |

FOREIGN PATENT DOCUMENTS

| | | | |
|---|---|---|---|
| CN | 101104401 | A | 1/2008 |
| CN | 109311454 | A | 2/2019 |
| DE | 4032762 | C1 | 8/1991 |
| KR | 19990002031 | U | 1/1999 |
| KR | 2001-0073839 | A | 8/2001 |
| KR | 10-0397002 | B1 | 8/2003 |
| KR | 10-2007-0102832 | A | 10/2007 |

* cited by examiner

*Primary Examiner* — Michael L Sehn
(74) *Attorney, Agent, or Firm* — Womble Bond Dickinson (US) LLP

(57) ABSTRACT

A vehicle, including: a windshield; and a first wiper arm including a first segment and a second segment attached to the first segment, wherein the first wiper arm is operatively attached to the vehicle at a first side of the vehicle such that the first wiper arm is rotatable about a first axis of rotation between at least an outer position and an inner position, and wherein the first wiper arm is shaped such that, when the first wiper arm is in the outer position, the first segment extends from the first axis of rotation away from a width center of the vehicle, and the second segment extends from the first segment at least partly along a height direction of the vehicle.

19 Claims, 6 Drawing Sheets

WINDSHIELD WIPERS

BACKGROUND

Windshield wipers are used to wipe away liquid, debris, and other visual obstructions from a vehicle's windshield that may reduce a driver's ability to see what is ahead of the vehicle. When a windshield is dramatically convexly shaped and/or when axes that windshield wiper arms rotate about are offset from portions of the windshield, windshield wiper blades may not maintain contact or uniform pressure against the windshield while rotating, and may be unable to effectively wipe certain portions of the center of the windshield. This can cause insufficient removal of liquid, debris, and/or other visual obstructions from the windshield, which can reduce the driver's visibility of what is ahead of the vehicle. It is in view of this general environment that the technology of the present disclosure is provided. This background section is provided only for purposes of introducing certain background material relating to the present disclosure and, thus, is not an admission of prior art.

SUMMARY

This Summary section introduces some features of non-limiting and non-exhaustive examples of the present disclosure, and is not intended to limit the scope of the claims.

In some examples, an aspect of the technology relates to a vehicle, including: a windshield; and a first wiper arm including a first segment and a second segment attached to the first segment, wherein the first wiper arm is operatively attached to the vehicle at a first side of the vehicle such that the first wiper arm is rotatable about a first axis of rotation between at least an outer position and an inner position, and wherein the first wiper arm is shaped such that, when the first wiper arm is in the outer position, the first segment extends from the first axis of rotation away from a width center of the vehicle, and the second segment extends from the first segment at least partly along a height direction of the vehicle.

In some examples, the first wiper arm is shaped such that, when the first wiper arm is in the inner position, the first segment extends from the first axis of rotation at least partly along the height direction, and the second segment extends from the first segment toward the width center of the vehicle. In some examples, the first segment includes a first part extending from the first axis of rotation along a first axis, and a second part extending from the first part to a distal end of the first segment along a second axis that forms an angle with the first axis of at least 60 degrees, and the second segment is attached to the distal end of the first segment. In some examples, the second segment is attached to the first segment by a hinge that applies a torque to the second segment relative to the first segment. In some examples, the windshield is a convex windshield that curves around a virtual axis that is parallel to the height direction and is positioned rearward relative to the windshield along a length direction of the vehicle extending from a front of the vehicle to a rear of the vehicle. In some examples, the vehicle further includes a second wiper arm including a first segment and a second segment attached to the first segment of the second wiper arm, wherein the second wiper arm is operatively attached to the vehicle at a second side of the vehicle opposite to the first side of the vehicle such that the second wiper arm is rotatable about a second axis of rotation between at least an outer position and an inner position, and wherein the second wiper arm is shaped such that, when the second wiper arm is in the outer position, the first segment of the second wiper arm extends from the second axis of rotation away from the width center of the vehicle, and the second segment of the second wiper arm extends from the first segment of the first wiper arm at least partly along the height direction. In some examples, the first and second axes of rotation are non-parallel to each other. In some examples, the vehicle further includes a vehicle control system including: a processor operatively coupled to the first and second windshield wiper arms; and a memory coupled to the processor unit and storing instructions that, when executed by the processor, cause the vehicle control system to perform a method, the method including: causing the first wiper arm to rotate through a plurality of cycles at a set frequency, and causing the second wiper arm to rotate through a plurality of cycles at the set frequency and out-of-sync from the plurality of cycles of the first wiper arm. In some examples, the first and second wiper arms are shaped and sized to wipe, during a cycle of each of the first and second wiper arms, a wipe area of the windshield having an upper edge that is, at a width center of the windshield, separated from a lower edge of the windshield by at least 60% of a distance between the lower edge of the windshield and an upper edge of the windshield at the width center of the windshield.

In some examples, an aspect of the technology relates to a vehicle, including: a windshield; a first wiper arm operatively attached to the vehicle at a left side of the windshield such that the first wiper arm is rotatable about a first axis of rotation between at least an outer position and an inner position; and a second wiper arm operatively attached to the vehicle at a right side of the windshield such that the second wiper arm is rotatable between at least an outer position and an inner position, wherein the first and second wiper arms are shaped and sized to wipe, during a cycle of each of the first and second wiper arms, a wipe area of the windshield having an upper edge that is, at a width center of the windshield, separated from a lower edge of the windshield by at least 60% of a distance between the lower edge of the windshield and an upper edge of the windshield at the width center of the windshield.

In some examples, the windshield is a convex windshield that curves at least partially around a virtual axis that is parallel to a height direction of the vehicle and is positioned rearward relative to the windshield along a length direction of the vehicle extending from a front of the vehicle towards a rear of the vehicle. In some examples, the vehicle further includes a driver seat positioned at a width center of the vehicle. In some examples, the first and second axes of rotation are non-parallel to each other. In some examples, extensions of the first and second axes of rotation meet and form an angle of at least 20 degrees. In some examples, the vehicle further includes a vehicle control system including: a processor operatively coupled to the first and second windshield wiper arms; and a memory coupled to the processor and storing instructions that, when executed by the processor, cause the vehicle control system to perform a method, the method including: causing the first wiper arm to rotate through a plurality of cycles at a set frequency, and causing the second wiper arm to rotate through a plurality of cycles at the set frequency and out-of-sync from the plurality of cycles of the first wiper arm. In some examples, the method includes causing the first and second wiper arms to concurrently rotate from their respective inner positions to their respective outer positions, and to concurrently rotate from their respective outer positions to their respective inner positions.

In some examples, the technology relates to a pair of wiper arms for a vehicle, the pair of wiper arms including: a first wiper arm, including: a first segment configured to rotatably attach to an axis of rotation at a proximal end of the first segment, wherein the first segment includes a first part extending along a first axis from the proximal end of the first segment, and a second part extending along a second axis from the first part of the first segment to a distal end of the first segment, and a second segment attached to the distal end of the first segment, and configured to attach to a wiper blade at an inner side of the second segment; and a second wiper arm, including: a third segment configured to rotatably attach to a vehicle about an axis of rotation at a proximal end of the third segment, wherein the third segment includes a third part extending along a third axis from the proximal end of the third segment, and a fourth part extending along a fourth axis from the third part of the third segment to a distal end of the third segment, and a fourth segment attached to the distal end of the third segment, and configured to attach to a wiper blade at an inner side of the fourth segment, wherein a coordinate system is defined by an X-axis, a Y-axis, and a Z-axis, which are mutually orthogonal, wherein the first wiper arm is shaped such that, when the first axis extends from the proximal end of the first segment along an X-axis direction and the second axis extends from the first part of the first segment at least partly in a Y-axis direction, the inner side of the second segment faces at least partly in a negative Z-axis direction, and wherein the second wiper arm is shaped such that, when the third axis extends from the proximal end of the third segment along a negative X-axis direction and the fourth axis extends from the third part of the third segment at least partly in the Y-axis direction, the inner side of the fourth segment faces at least partly in the negative Z-axis direction.

In some examples, the first and second axes respectively of the first and second parts of the first segment form an angle of at least 60 degrees, and the third and fourth axes respectively of the third and fourth parts of the third segment form an angle of at least 60 degrees. In some examples, the second segment is attached to the first segment by a first hinge that is configured to apply a torque to the second segment relative to the first segment and with respect to a first hinge axis of rotation that is within 30 degrees from being parallel to the X-axis when the first axis extends from the proximal end of the first segment along the X-axis direction, and the fourth segment is attached to the third segment by a second hinge that is configured to apply a torque to the fourth segment relative to the third segment and with respect to a second hinge axis of rotation that is within 30 degrees from being parallel to the X-axis when the third axis extends from the proximal end of the third segment along the negative X-axis direction. In some examples, the first wiper arm is shaped such that, when the first and second axes of the first and second parts are positioned within an X-Y plane defined by the X-axis and the X-axis, a longitudinal axis of the second segment is substantially parallel to the second axis, and the second wiper arm is shaped such that, when the third and fourth axes of the third and fourth parts are positioned within the X-Y plane, a longitudinal axis of the fourth segment is substantially parallel to the fourth axis.

BRIEF DESCRIPTION OF THE DRAWINGS

The drawings, together with the specification, illustrate example embodiments of the present disclosure.

DETAILED DESCRIPTION

Figure 1:
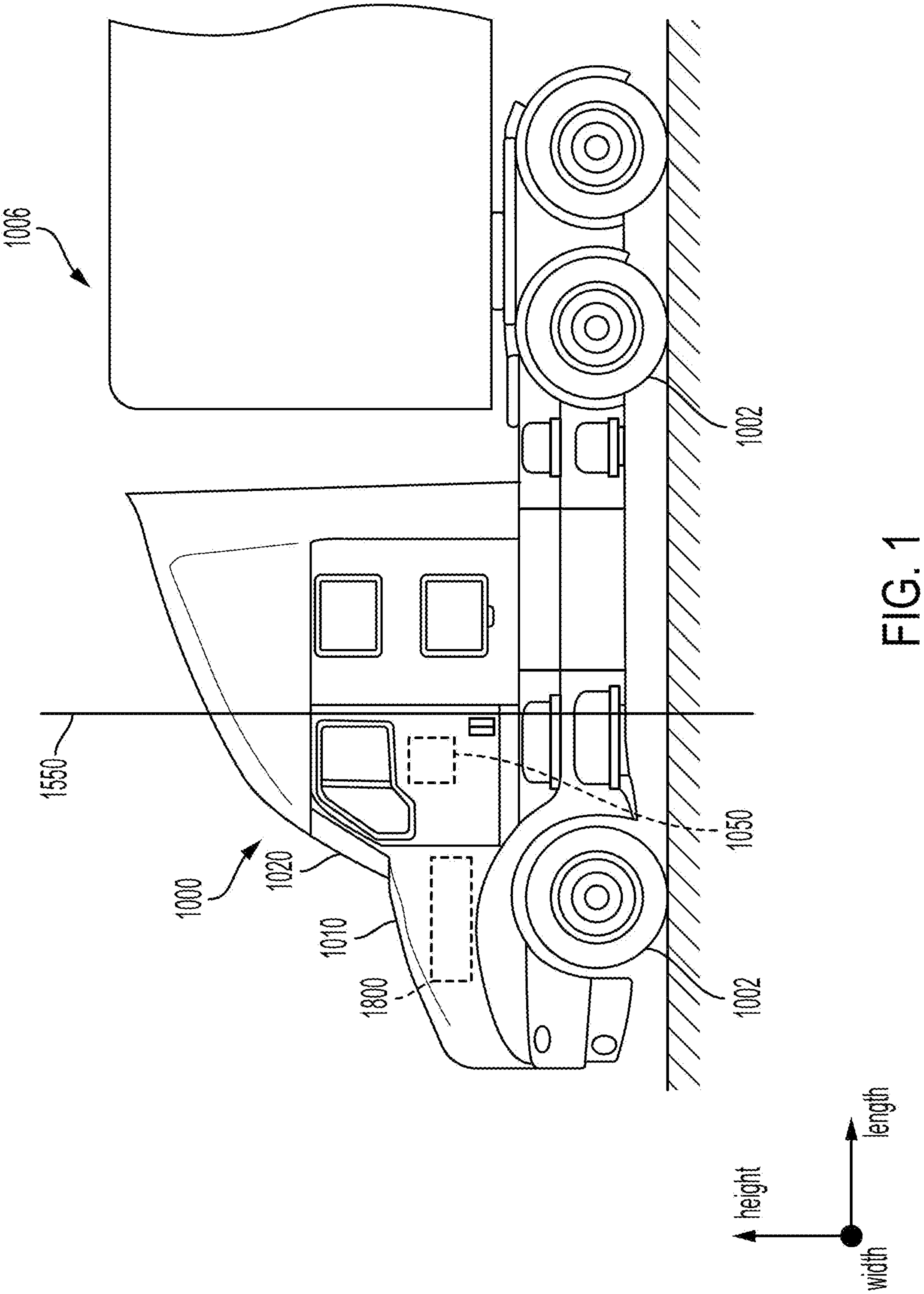
FIG. 1 depicts a side view of a vehicle according to some examples.

It will be understood that, although the terms “first”, “second”, “third”, etc., may be used herein to describe various elements and/or features, these elements and/or features should not be limited by these terms. These terms are only used to distinguish one element, or feature from another element or feature. Thus, a first element or feature discussed below could be termed a second element or feature, without departing from the spirit and scope of the present disclosure.

The terminology used herein is for the purpose of describing particular examples only and is not intended to be limiting of the present disclosure. As used herein, the singular forms “a”, “an” and “the” are intended to include the plural forms as well, unless the context clearly indicates otherwise. It will be further understood that the terms “comprises,” “comprising,” “includes,” and “including,” when used in this specification, specify the presence of stated elements and/or features, but do not preclude the presence or addition of one or more other elements and/or features. As used herein, the term “and/or” includes any and all combinations of one or more of the associated listed items. Expressions such as “at least one of,” when preceding a list of elements, modify the entire list of elements and do not modify the individual elements of the list. Further, the use of “may” when describing examples of the present disclosure refers to “one or more examples of the present disclosure.”

It will be understood that when an element or feature is referred to as being “on”, “connected to”, or “coupled to”, another element or feature, it can be directly on, connected to, or coupled to the other element or feature, or one or more intervening element(s) or feature(s) may be present. In contrast, when an element or feature is referred to as being “directly on,” “directly connected to”, or “directly coupled to” another element or feature, there are no intervening elements or feature present.

Also, any numerical range recited herein is intended to include all sub-ranges of the same numerical precision subsumed within the recited range. For example, a range of “1.0 to 10.0” is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It is understood that, if two lines intersect, they form two angles, one reflexive (more than 180 degrees) and one non-reflexive (less than 180 degrees). All angles referred to herein as being formed between two lines are intended to be non-reflexive angles (180 degrees or less). For example, if line A and line B are referred to as forming an angle X of at least Y degrees, the recited angle X shall include $Y \leq X \leq 180$ degrees.

Figure 2:
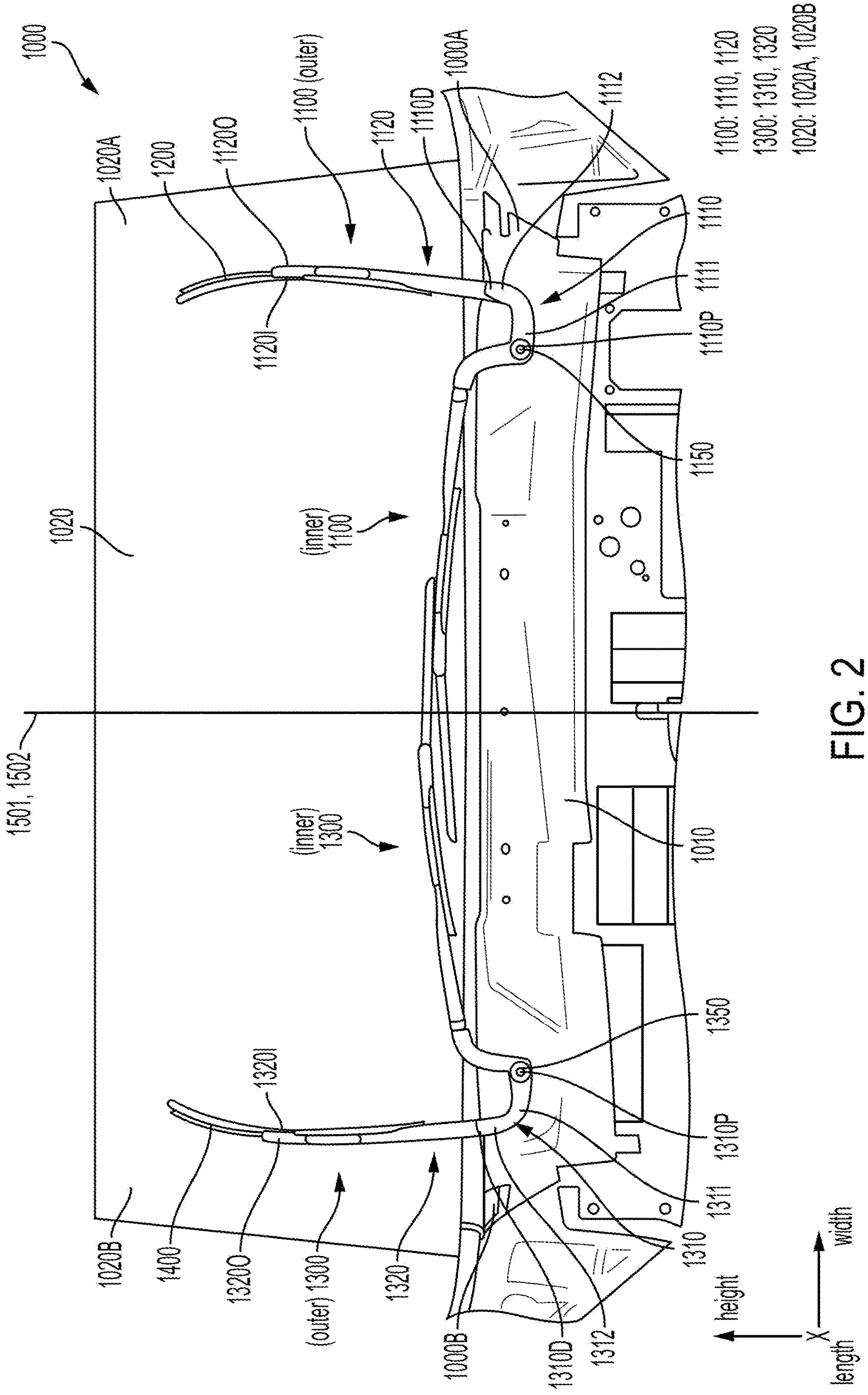
FIG. 2 depicts a front view of part of a vehicle according to some examples.
Figure 3B:
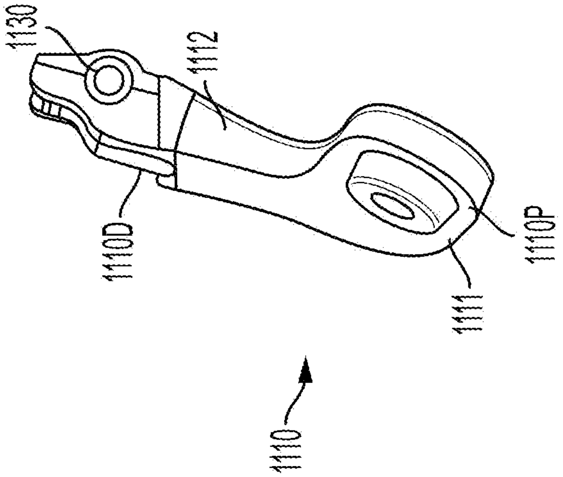
FIG. 3B depicts an enlarged perspective view of a first segment of the first wiper arm of FIG. 3A.
Figure 3A:
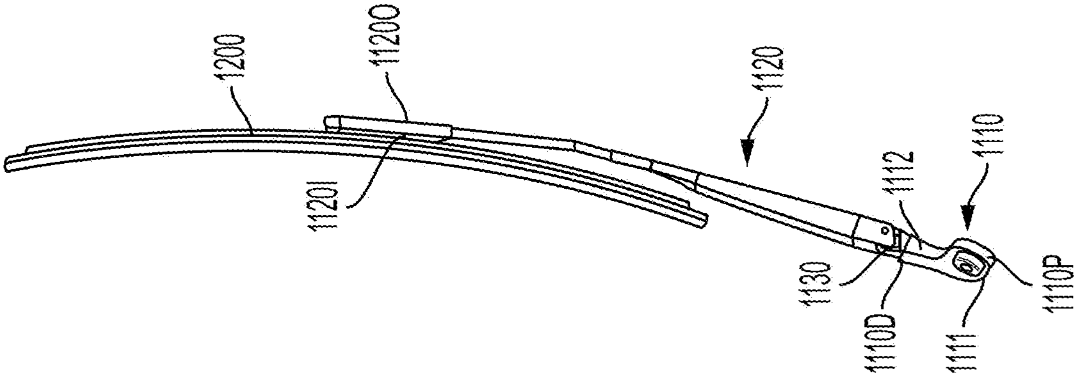
FIG. 3A depicts a perspective view of a first wiper arm according to some examples.
Figure 4:
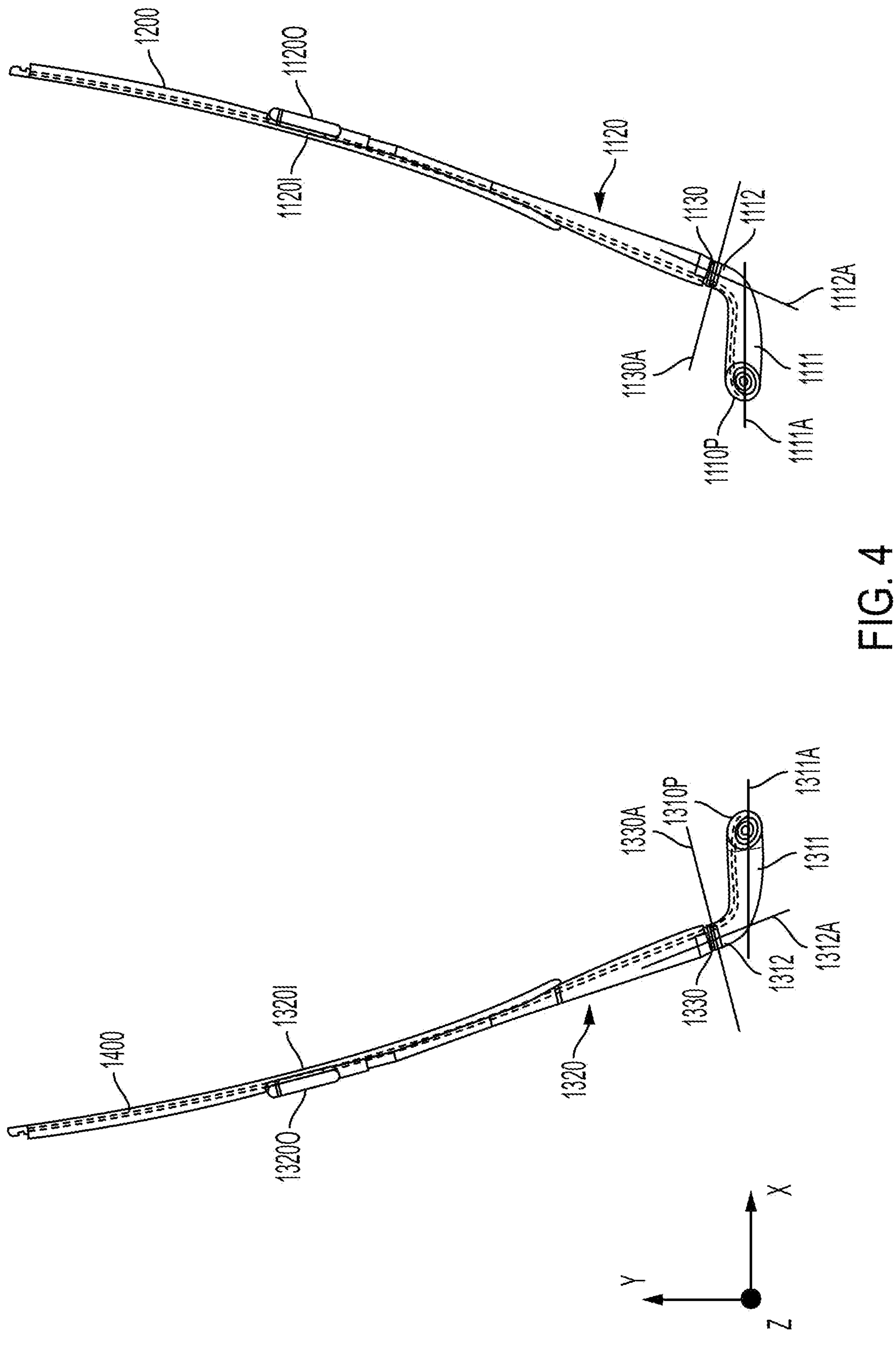
FIG. 4 depicts the first and second wiper arms according to some examples when arranged at least partly in an X-Y plane.

FIG. 1 depicts a side view of a vehicle 1000 according to some examples. FIG. 2 depicts a front view of part of a vehicle 1000 according to some examples. FIG. 3A depicts a perspective view of a first wiper arm 1100 according to some examples. FIG. 3B depicts an enlarged view of a first segment 1110 of the first wiper arm 1100 of FIG. 3A. FIG. 4 depicts first and second wiper arms 1100 and 1300 according to some examples when arranged at least partly in an X-Y plane.

Referring concurrently to FIGS. 1-4, the vehicle 1000 may be any suitable type of vehicle and may be of different types and/or sizes. In the depicted example, the vehicle 1000 is a truck, for example, a Class 8 truck. However, aspects of the disclosed subject matter may have wide application and, therefore, may be suitable for use with other types of vehicles, such as passenger vehicles, buses, light, medium, and heavy-duty vehicles, motor homes, etc.

The vehicle 1000 may include a chassis supported by wheels 1002, a front hood 1010, a windshield 1020, a cabin including a driver seat 1050 from which a driver may steer the vehicle 1000, an engine (not shown), and a computing device 1800. A steering wheel and/or a control panel may be positioned in front of the driver seat 1050 such that the driver can control at least some operations of the vehicle 1000 from the driver seat 1050. The vehicle 1000 may be a part of a tractor-trailer combination, or a tractor-trailer system, which may include the vehicle 1000 having a so-called fifth wheel by which a box-like, flat-bed, or tanker semi-trailer 1006 (among other examples) may be attached for transporting cargo or the like. In addition, the particular vehicle configuration shown in FIG. 1 is intended only to be used as a simple example. Other vehicle configurations may be used and are contemplated. For example, the windshield 1020, in some examples, may be more convex than shown, particularly in example vehicles in which a center-positioned driver seat 1050 is included.

The windshield 1020 may define at least part of a front portion of the cabin and can allow the driver to see ahead of the vehicle 1000. In addition, the windshield may be dramatically convex and wrap around to the sides of the vehicle 1000 to allow the driver to see at least partially out of the sides of the vehicle 1000 (e.g., while sitting in the driver seat 1050). The windshield 1020 may have a first side 1020A (e.g., a left side) and a second side 1020B (e.g., a right side). The front hood 1010 may be positioned in front of the windshield 1020 and may be configured to conceal the engine or other drive-train elements (e.g., electric batteries, motors, etc.). The vehicle 1000 may have a first side 1000A (e.g., a left side) and a second side 1000B (e.g., a right side).

The vehicle 1000 may include a first wiper arm 1100, a first wiper blade 1200 configured to attach to the first wiper arm 1100, a second wiper arm 1300, and a second wiper blade 1400 configured to attach to the second wiper arm 1300. The first and second wiper arms 1100 and 1300 may be operatively attached to the vehicle 1000 (e.g., respectively at the first and second sides 1000A and 1000B of the vehicle 1000) such that the first and second wiper arms 1100 and 1300 are respectively rotatable about first and second axes of rotation 1150 and 1350.

The first and second wiper arms 1100 and 1300 may each be rotatable between an outer position and an inner position. In FIG. 2, each of the first and second wiper arms 1100 and 1300 are depicted in both the outer position (see "1100 (outer)" and "1300 (outer)") and the inner position (see "1100 (inner)" and "1300 (inner)"). As explained in more detail below, during operation, the first and second wiper arms 1100 and 1300 may each be rotated back and forth between their respective outer and inner positions, which causes the first and second wiper blades 1200 and 1400 to wipe respective areas of the windshield 1020. This can move precipitation and debris off from the wiped areas of the windshield 1020 to improve visibility through the windshield 1120.

The first wiper arm 1100 may include a first segment 1110 and a second segment 1120 attached to the first segment 1110. The first segment 1110 may have a proximal end 1110P at which the first wiper arm 1100 is rotatably coupled to the vehicle 1000 about a first axis of rotation 1150, and a distal end 1110D at which the second segment 1120 is attached to the first segment 1110. The first segment 1110 may include a first part 1111 that extends along a first axis 1111A from the proximal end 1110P, and a second part 1112 that extends along a second axis 1112A from the first part 1111 to the distal end 1110D. In some examples, the first and second parts 1111 and 1112 are integrally formed together. In some other examples, the second part 1112 is attached (e.g., fixedly attached) to the first part 1111 (e.g., during manufacture of the first wiper arm 1100).

The second segment 1120 may have an inner side 11201 that is configured to attach to the first wiper blade 1200, and an outer side 11200 opposite to the inner side 11201. The second segment 1120 may include any suitable type of connection for connecting to the first wiper blade 1200, such as a J-hook, a side pin, a bayonet, a pinch tab, a pinch tab button, a wrist action, a dead locker, a saddle hook, etc. The first wiper arm 1100 may be configured such that, when the first wiper arm 1100 is rotatably coupled to the vehicle 1000 about the first axis of rotation 1150, the inner side 11201 generally faces toward the windshield 1020 and the outer side 11200 generally faces away from the windshield 1020.

In some examples, the second segment 1120 is rotatably coupled to the first segment 1110 by a first hinge 1130 such that the second segment 1120 is rotatable relative to the first segment 1110 about a first hinge axis 1130A of the first hinge 1130. The first hinge 1130 may form a part (e.g., an integral part) of the first segment 1110 (e.g., part of the distal end 1110D of the first segment 1110), may form a part (e.g., an integral part) of the second segment 1120, or may be attachable to the first and second segments 1110 and 1120. The first hinge 1130 may be configured to apply a torque on the second segment 1120 relative to the first segment 1110 to rotate the second segment 1120 toward the windshield 1020 when the first wiper arm 1100 is rotatably coupled to the vehicle 1000 about the first axis of rotation 1150. The hinge 1130 may allow the second segment 1120 (and the first wiper blade 1200) to be pushed toward the windshield 1020 so that the first wiper blade 1200 reliably maintains contact with the windshield 1020. The first hinge 1130 can also allow the second segment 1120 (and the first wiper blade 1200) to be pulled back away from the windshield 1020, which can be desirable when the first wiper blade 1200 needs to be replaced. This can make removing and replacing the first wiper blade 1200 easier.

The second wiper arm 1300 may have at least some features similar to the features of the first wiper arm 1100 and, thus, redundant descriptions may not be provided. The second wiper arm 1300 may include a first segment 1310 and a second segment 1320 attached to the first segment 1310, for example, by a second hinge 1330 in a similar or same manner as the second segment 1120 of the first wiper arm 1100 is attached to the first segment 1110 of the first wiper arm 1100. The first segment 1310 of the second wiper arm 1300 may have a proximal end 1310P and a distal end 1310D, and the second wiper arm 1300 may be operatively attached to the vehicle 1000 about the second axis of rotation 1350 at the proximal end 1310P of the first segment 1310 of the second wiper arm 1300. The first segment 1310 of the second wiper arm 1300 may include a first part 1311 extending along a first axis 1311A from the proximal end 1310P, and a second part 1312 extending along a second axis 1312A from the first part 1311 to the distal end 1310D. The second segment 1320 of the second wiper arm 1300 may have an inner side 1320I and an outer side 13200 opposite to the inner side 1320I, and the second segment 1320 of the second wiper arm 1300 may be configured to attach to the second wiper blade 1400 at the inner side 1320I of the second segment 1320 of the second wiper arm 1300.

The second wiper arm 1300 may be complementary to the first wiper arm 1100. For example, the first and second wiper arms 1100 and 1300 may be shaped and sized such that, when they are operatively attached to the vehicle 1000 and both are in their respective outer positions (or both are in their respective inner positions), they are symmetric about a plane parallel to a length-height plane of the vehicle 1000 (e.g., a plane parallel to the length-height plane and extending through a width center 1501 of the vehicle 1000).

Referring to FIGS. 1 and 2, the length-height plane may be a plane parallel to both a length direction and a height direction of the vehicle 1000. The height direction of the vehicle 1000 may be a direction perpendicular to a ground plane that the wheels 1002 are all configured to be on during normal operation of the vehicle 1000. The width direction of the vehicle 1000 may be a direction perpendicular to the vehicle's height direction and that extends between opposite sides of the vehicle 1000 (e.g., from the vehicle's second side 1000B to the vehicle's first side 1000A). The length direction of the vehicle 1000 may be a direction perpendicular to both the vehicle's height and width directions, and may extend from a front end of the vehicle 1000 to a rear end of the vehicle 1000. A width-height-length coordinate system is depicted in FIGS. 1 and 2.

The windshield 1020 may have a convex shape such that it curves around a virtual axis 1550 that is parallel to the height direction of the vehicle 1000 and is positioned rearward relative to the windshield 1020. In some examples, the windshield 1020 has a radius of curvature (e.g., an average radius of curvature, a radius of curvature as measured at a width center 1502 of the windshield 1020, etc.) of greater than 750 mm and less than 2,000 mm. In some examples, the radius of curvature in the width-height plane of the vehicle 1000 is not constant, and the windshield 1020 may curve more dramatically towards the first and second sides 1020A and 1020B than at the width center 1502 of the windshield 1020. Further, the windshield 1020 may pitch in the length direction while moving in the height direction from the lower edge of the windshield 1020 to the upper edge of the windshield 1020. As such, the radius of curvature at a lower edge of the windshield 1020 versus an upper edge of the windshield 1020 may not be the same, and the windshield 1020 may curve more dramatically (may have a smaller radius) at or near the upper edge of the windshield 1020 than at or near the lower edge of the windshield 1020. For example, in the width-height plane, the radius of curvature of the windshield 1020 at the lower edge of the windshield 1020 may be greater than 750 mm and less than 1.250 mm, and the radius of curvature of the windshield 1020 at the upper edge of the windshield 1020 may be greater than 1,250 mm and less than 1,750 mm.

The first and second wiper arms 1100 and 1300 may be shaped and sized, and operatively coupled to the vehicle 1000, to improve the capacity of the first and second wiper arms 1100 and 1300 (together with the first and second wiper blades 1200 and 1400 respectively attached to the first and second wiper arms 1100 and 1300) to wipe the convexly shaped windshield 1020.

The first and second axes of rotation 1150 and 1350 about which the first and second wiper arms 1100 and 1300 are configured to rotate may be nonparallel to each other. For example, extensions of the first and second axes of rotation 1150 and 1350 may extend partly rearwardly (e.g., partly along the length direction) and partly inwardly (e.g., partly along a direction toward the width center 1501 of the vehicle 1000). For example, the extension of the first axis of rotation 1150 may extend partly rearwardly and partly along the negative width direction, and the extension of the second axis of rotation 1350 may extend partly rearwardly and partly along the width direction. In some examples, each of the first and second axes of rotation 1150 and 1350 may each form an angle of at least 5 degrees, 10 degrees, 15 degrees, 20 degrees, 30 degrees, 45 degrees, or 60 degrees with a line parallel to the length direction. In some examples, the first and second axes of rotation 1150 and 1350 may be symmetric about a plane parallel to the length-height plane (e.g., a plane that extends through a center of the vehicle 1000 and is parallel to the length-height plane). For example, the extensions of the first and second axes of rotation 1150 and 1350 may meet (e.g., at a width center 1501 of the vehicle 1000) and form an angle of at least 10 degrees, 20 degrees, 30 degrees, 40 degrees, 60 degrees, 90 degrees, or 120 degrees. In some examples, extensions of the first and second axes of rotation 1150 and 1350 may extend partly rearwardly along the length direction, partly inwardly toward the width center 1501 of the vehicle 1000, and partly downwardly along the negative height direction.

Forming the first and second axes of rotation 1150 and 1350 to be nonparallel, and to be angled at least partly inwardly toward the width center 1501 of the vehicle 1000 can help maintain contact between the first and second wiper blades 1200 and 1400 and the convex windshield 1020 when the first and second wiper arms 1100 and 1300 rotate from their inner positions to their outer positions. This is because, as the convex windshield 1020 extends outwardly from a width center 1502 of the windshield 1020, the convex windshield 1020 also extends rearwardly along the length direction of the vehicle 1000. However, because the first and second axes of rotation 1150 and 1350 are angled inwardly toward the width center 1501 of the vehicle 1000, they will each also move both outwardly from the width center 1501 of the vehicle 1000 and rearwardly along the length direction of the vehicle 1000 as the first and second wiper arms 1100 and 1300 rotate from their inner positions to their outer positions. Accordingly, maintenance and uniformity of contact and pressure of the first and second wiper blades 1200 and 1400 against the convex windshield 1020 while the first and second wiper arms 1100 and 1300 move between their inner and outer positions can be improved compared to if the first and second wiper arms 1100 and 1300 were both parallel to the length direction of the vehicle.

The angles that the first and second axes of rotation 1150 and 1350 form to respective lines parallel to the length direction of the vehicle 1000 may depend on the radius of curvature of the convex windshield 1020. For example, as the average radius of curvature of the convex windshield 1020 becomes larger, the convex windshield 1020 flattens out, and smaller angles between the first and second axes of rotation 1150 and 1350 and the lines parallel to the length direction may be better suited for maintaining contact and uniformity of pressure of the first and second wiper blades 1200 and 1400 against the convex windshield 1020. Conversely, as the average radius of curvature of the convex windshield 1020 becomes smaller, the curvature of the convex windshield 1020 becomes more significant, and larger angles between the first and second axes of rotation 1150 and 1350 and the lines parallel to the length direction may be better suited.

The first and second axes of rotation 1150 and 1350 may be offset from the windshield 1020 by a set distance (e.g., a set smallest distance to a lower edge of the windshield 1020), for example, between 50 mm and 200 mm (e.g., between 70 mm and 150 mm or between 90 mm and 120 mm). By shaping the first and second wiper arms 1100 and 1300 to have a curve or a change in direction of extension, as described herein, the first and second wiper blades 1200 and 1400 can wipe a greater area of the windshield 1020 when the first and second axes of rotation 1150 and 1350 are offset from the windshield 1020, compared to if the first and second wiper arms 1100 and 1300 were generally straight.

The first and second segments 1110 and 1310 may be shaped and sized such that, when the first and second wiper arms 1100 and 1300 are in their outer positions, the first parts 1111 and 1311 extend along their respective axes 1111A and 1311A from the proximal ends 1110P and 1310P at least partly outwardly away from the width center 1501 of the vehicle 1000 (e.g., partly outwardly and partly rearwardly). For example, the first part 1111 may extend along its axis 1111A from the proximal end 1110P at least partly along the width direction (e.g., partly along the width direction and partly rearwardly), and the first part 1311 may extend along its axis 1311A from the proximal end 1310P at least partly along the negative width direction (e.g., partly along the negative width direction and partly rearwardly). The second parts 1112 and 1312 may extend along their respective axes 1112A and 1312A from the first parts 1111 and 1311 at least partly in the height direction. The second segments 1120 and 1320 may also extend at least partly in the height direction. In some examples, the second segments 1120 and 1320 may extend substantially in parallel with the axes 1112A and 1312A of the second parts 1112 and 1312. For example, longitudinal axes of the second segments 1120 and 1320 may be within 20 degrees, 15 degrees, 10 degrees, 5 degrees, 2 degrees, or 1 degree of being parallel to the axes 1112A and 1312A of their respective second parts 1112 and 1312.

When the first and second wiper arms 1100 and 1300 are in their inner positions, the first parts 1111 and 1311 may extend along their respective axes 1111A and 1311A from the proximal ends 1110P and 1310P at least partly along the height direction. And the second parts 1112 and 1312 may extend along their respective axes 1112A and 1312A from the first parts 1111 and 1311 at least partly toward the width center 1502 of the windshield 1020. For example, the second part 1112 may extend along its axis 1112A from the first part 1111 in the negative width direction, and the second part 1312 may extend along its axis 1312A from the first part 1311 in the width direction. The second segments 1120 and 1320 may also extend at least partly toward the width center 1501 of the vehicle.

In some examples, respective lengths of the first parts 1111 and 1311 are at least 0.8, 0.9, 1.0, 1.1, 1.2, or 1.3 times the distances (e.g., the shortest distances) by which the first and second axes of rotation 1150 and 1350 are respectively separated from the lower edge of the windshield 1020. For example, the lengths of the first parts 1111 and 1311 may be at least as great as the distances by which the first and second axes of rotation 1150 and 1350 are respectively separated from the lower edge of the windshield 1020.

When the first and second wiper arms 1100 and 1300 are shaped as described herein and are in their inner positions, the first and second wiper arms 1100 and 1300 may first extend upward toward the windshield 1020 and then extend at least partly inwardly toward the width center 1502 of the windshield 1020. Further, when the first and second wiper arms 1100 and 1300 are in their outer positions, the first and second wiper arms 1100 and 1300 may first extend outwardly away from the width center 1502 of the windshield 1020, and then extend upwardly over at least part of the windshield 1020. Accordingly, even when the first and second axes of rotation 1150 and 1350 are spaced apart from the windshield 1020, the first and second wiper blades 1200 and 1400 may generally extend parallel to the width direction when the first and second wiper arms 1100 and 1300 are in their inner positions, and may wipe substantially the entire lower half of the width center 1502 of the windshield 1020. This can improve the driver's ability to see ahead of the vehicle 1000 during a rainstorm or under other conditions in which debris, precipitation, or other visual obstructions fall on this portion of the windshield 1020. This can be especially advantageous for vehicles where the driver seat is positioned at approximately the width center 1501 of the vehicle 1000, because the center portion of the windshield 1020 will be in front of the driver.

In contrast, in a comparison example where the first and second axes of rotation 1150 and 1350 are offset from the windshield 1020 and the first and second wiper arms 1100 and 1300 are generally straight, the first and second wiper arms 1100 and 1300 may not rotate inwardly to a degree such that the first and second wiper arms 1100 and 1300 (and the first and second wiper blades 1200 and 1400) are generally parallel to the width direction. This would result in the first and second wiper blades 1200 and 1400 disengaging from the windshield 1020 and being rotated to positions below the windshield 1020, which may cause complications or be undesirable. Accordingly, the first and second wiper arms 1100 and 1300 may not rotate inwardly to a degree such that the first and second wiper blades 1200 and 1400 disengage from the windshield 1020. In such a comparison example, the first and second wiper blades 1200 and 1400 will generally extend along a direction nonparallel to the width direction (e.g., partly inwardly and partly upwardly along the height direction) when the first and second straight wiper arms 1100 and 1300 are in their inner positions. Thus, the first and second wiper blades 1200 and 1400 will wipe less of the lower half and, in some examples, also less of the upper half, of the width center 1502 of the windshield 1020. For example, the first and second wiper blades 1200 and 1400 may not wipe the lowermost portion of the width center 1502 of the windshield 1020. This can be undesirable because it can prevent the first and second wiper blades 1200 and 1400 from clearing precipitation, debris, and other visual obstructions from the lower portion and, in some examples, also the upper portion, of the width center 1502 of the windshield 1020. This can be especially disadvantageous when the driver seat is positioned at the width center 1501 of the vehicle 1000.

Additionally, in this comparison example, the first and second straight wiper arms 1100 and 1300 may be significantly restricted in terms of how far they can both be rotated inwardly toward their inner positions. This is because the first and second wiper blades 1200 and 1400 may extend both inwardly and upwardly along the height direction when they are both in their inner positions. Thus, the first and second wiper blades 1200 and 1400 may collide with each other as the first and second straight wiper arms 1100 and 1300 are rotated inwardly. In contrast, in examples of the present disclosure where the first and second wiper arms 1100 and 1300 are curved or otherwise undergo a change in direction of extension, the first and second wiper arms 1100 and 1300 can both be rotated inwardly until they are both at or near a lower edge of the windshield 1020. For example, as shown in FIG. 2, the second wiper arm 1300 and the second wiper blade 1400 can be folded over onto the first wiper arm 1100 and the first wiper blade 1200 without being blocked by the first wiper arm 1100 and the first wiper blade 1200.

A description of the shapes of the first and second wiper arms 1100 and 1300 according to some examples, when the first and second wiper arms 1100 and 1300 are positioned and oriented at least partly in an X-Y plane, will now be provided with reference to FIG. 4. An X-Y-Z coordinate system may be defined to include an X-axis, a Y-axis perpendicular to the X-axis, and a Z-axis perpendicular to both the X-axis and the Y-axis. The X-Y plane may be defined as the view of the page of FIG. 4, and the Z-axis may extend out from the page of FIG. 4. It should be appreciated that placing the first and second wiper arms 1100 and 1300 in the theoretical X-Y-Z coordinate system of FIG. 4 is done for illustration purposes only, and it is anticipated that, when installed on a vehicle, they may not be oriented in this manner relative to each other.

In FIG. 4, the first and second wiper arms 1100 and 1300 are positioned and oriented such that the first axes 1111A and 1311A of the first parts 1111 and 1311 are parallel to the X-axis, and such that the second axes 1112A and 1312A of the second parts 1112 and 1312 are within the X-Y plane. The first part 1111 may extend from the proximal end 1110P along the X-axis direction, and the first part 1311 may extend from the proximal end 1310P along the negative X-axis direction. The second parts 1112 and 1312 may each extend from their respective first parts 1111 and 1311 at least partly along the Y-axis direction. The first and second parts 1111 and 1112 (e.g., the axes 1111A and 1112A of the first and second parts 1111 and 1112) may form an angle between 60 degrees and 140 degrees, for example, 90 degrees. The first and second parts 1311 and 1312 (e.g., the axes 1311A and 1312A of the first and second parts 1311 and 1312) may form an angle between 60 degrees and 140 degrees, for example, 90 degrees.

The first and second wiper arms 1100 and 1300 may be shaped such that, when they are positioned and oriented in the X-Y plane in this manner, the inner sides 11201 and 1320I of the second segments 1120 and 1320 may both face in the same direction (e.g., the negative Z-axis direction as shown in FIG. 4) and/or the outer sides 11200 and 13200 may both face in the same direction (e.g., the Z-axis direction as shown in FIG. 4).

Also, the first and second hinge axes 1130A and 1330A of the first and second hinges 1130 and 1330 may be within 45 degrees, 30 degrees, 20 degrees, 15 degrees, 10 degrees, or 5 degrees from being parallel to the X-axis. For example, the first and second hinge axes 1130A and 1330A may be in the X-Y plane, and may form angles respectively with the first axes 1111A and 1311A of the first parts 1111 and 1311 that are less than 45 degrees, 30 degrees, 20 degrees, 15 degrees, 10 degrees, or 5 degrees.

The first hinge 1130 may be configured to apply a torque to the second segment 1120 relative to the first segment 1110 along a clockwise rotational direction in a view along a direction parallel to the first hinge axis 1130A and at least partly in the negative X-axis direction. The second hinge 1330 may be configured to apply a torque to the second segment 1320 relative to the first segment 1310 along a clockwise rotational direction in a view along a direction parallel to the second hinge axis 1330A and at least partly in the negative X-axis direction. In some examples, the first and second hinges 1130 and 1330 may be configured to apply torques to the second segments 1120 and 1320 relative to the first segments 1110 and 1310 such that forces on the second segments 1120 and 1320 (when the second segments 1120 and 1320 extend at least partly in the Y-axis direction) are at least partly in the negative Z-axis direction.

The second segments 1120 and 1320 may both extend at least partly in the Y-axis direction. For example, the second segments 1120 and 1320 may extend from the first segments 1110 and 1310 along longitudinal axes that are substantially parallel (e.g., within 20 degrees, 15 degrees, 10 degrees, 5 degrees, 2 degrees, or 1 degree from being parallel) to the axes 1112A and 1312A of the second parts 1112 and 1312. In some examples, the second segments 1120 and 1320 may be straight. In some other examples, the second segments 1120 and 1320 have a curved shape such that the longitudinal axes of the second segments 1120 and 1320 change along the lengths of the second segments 1120 and 1320 and are within 20 degrees, 15 degrees, 10 degrees, 5 degrees, 3 degrees, or 1 degree from being parallel to an average longitudinal axis.

Figure 5:
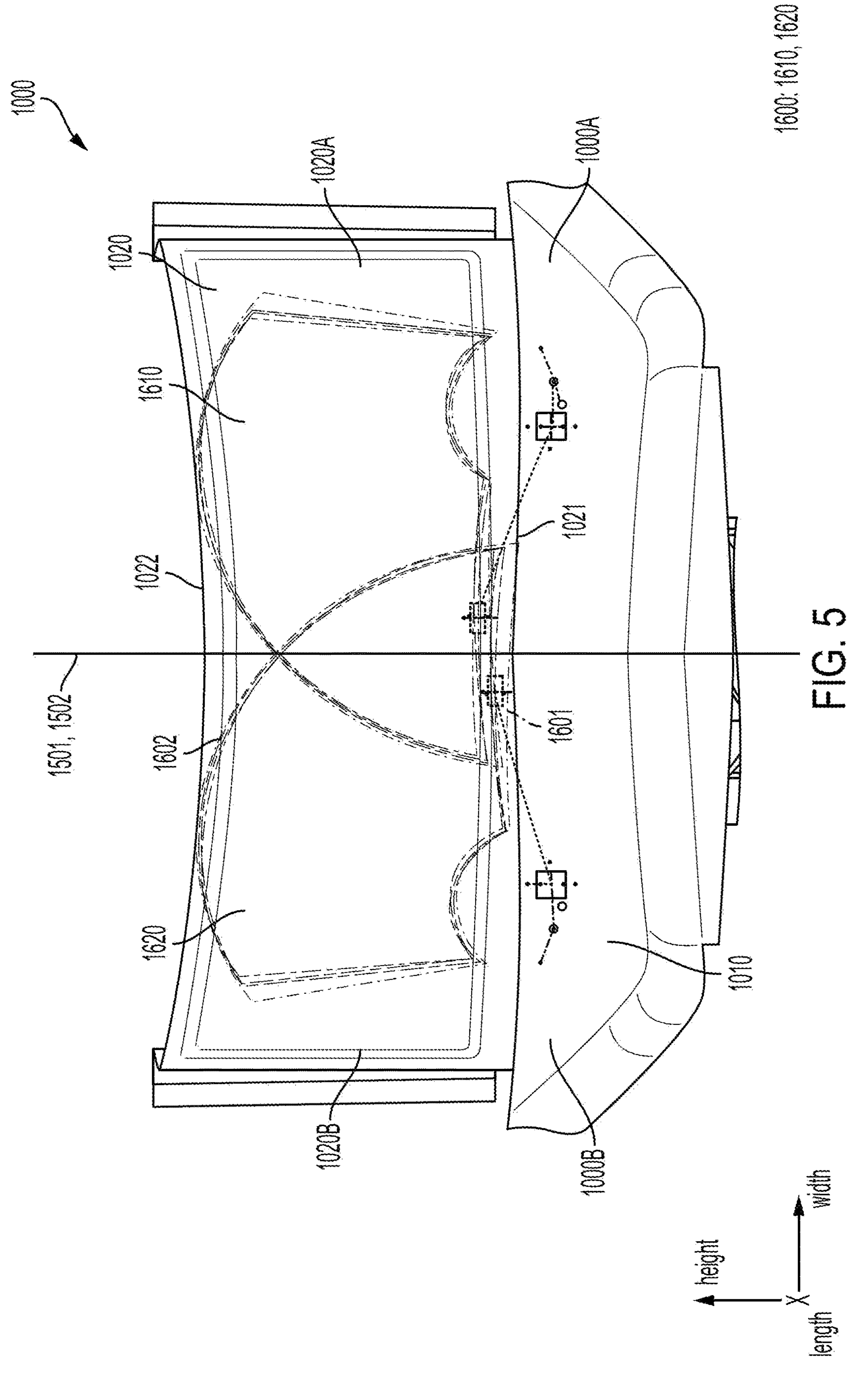
FIG. 5 depicts another front view of part of a vehicle according to some examples and a wipe area that first and second wiper blades wipe when the first and second wiper arms each move through a cycle.

FIG. 5 depicts another front view of part of the vehicle 1000 of FIG. 1 and a wipe area 1600 that the first and second wiper blades 1200 and 1400 are to wipe when the first and second wiper arms 1100 and 1300 move through at least one cycle each.

The windshield 1020 may have a lower edge 1021 proximal to the hood 1010, and an opposite upper edge 1022 distal to the hood 1010. The upper edge 1022 may be higher up along the height direction than the lower edge 1021. The wipe area 1600 may be formed by the joinder of a first wipe area 1610 and a second wipe area 1620. The first wipe area 1610 is an area of the windshield 1020 that the first wiper blade 1200 is to wipe when the first wiper arm 1100 moves through a cycle, and the second wipe area 1620 is an area of the windshield 1020 that the second wiper blade 1400 is to wipe when the second wiper arm 1300 moves through a cycle. The first and second wipe areas 1610 and 1620 may partially overlap. The wipe area 1600 may have a lower edge 1601 proximal to the lower edge 1021 of the windshield 1020, and an opposite upper edge 1602 distal to the lower edge 1021 of the windshield 1020. In some examples, the lower edge 1601 of the wipe area 1600 may be at or near the lower edge 1021 of the windshield 1020.

The wiper arms 1100 and 1300 may be shaped and sized such that a distance by which the upper edge 1602 of the wipe area 1600 at the width center 1502 of the windshield 1020 is separated from the lower edge 1021 of the windshield 1020 is at least 0.6, 0.65, 0.7, 0.75, 0.8, 0.85, or 0.9 times a distance between the lower and upper edges 1021 and 1022 of the windshield 1020 at the width center 1502 of the windshield 1020. In some examples, the wiper arms 1100 and 1300 are shaped and sized such that a distance between the lower and upper edges 1601 and 1602 of the wipe area 1600 at the width center 1502 of the windshield 1020 is at least 0.6, 0.65, 0.7, 0.75, 0.8, 0.85, or 0.9 times the distance between the lower and upper edges 1021 and 1022 of the windshield 1020 at the width center 1502 of the windshield 1020.

In some examples, the windshield 1020 may include a visible part and an opaque part. For example, an adhesive layer (e.g., a black colored adhesive layer) may be used to adhere the windshield 1020 to the vehicle 1000, and the adhesive layer may cause part of the windshield 1020 to be opaque (not allowing objects outside the vehicle 1000 to be seen from a driver position). In some examples, the opaque part of the windshield 1020 may cover at least part of the edges (e.g., the lower edge, the upper edge, the left edge, and/or the right edge) of the windshield 1020. The wiper arms 1100 and 1300 may be shaped and sized such that a distance by which the upper edge 1602 of the wiper area 1600 at the width center 1502 of the windshield 1020 is separated from a lower edge of the visible part of the windshield 1020 is at least 0.65, 0.7, 0.75, 0.8, 0.85, or 0.9 times a distance from the lower edge of the visible part of the windshield 1020 to an upper edge of the visible part of the windshield 1020.

By shaping and sizing the wiper arms 1100 and 1300 such that the wipe area 1600 covers a large portion of the center of the windshield 1020, the driver's visibility of what is ahead of the vehicle 1000 may be improved. This can be especially beneficial for vehicles 1000 where the driver seat is positioned at approximately the width center 1501 of the vehicle 1000.

Figure 6:
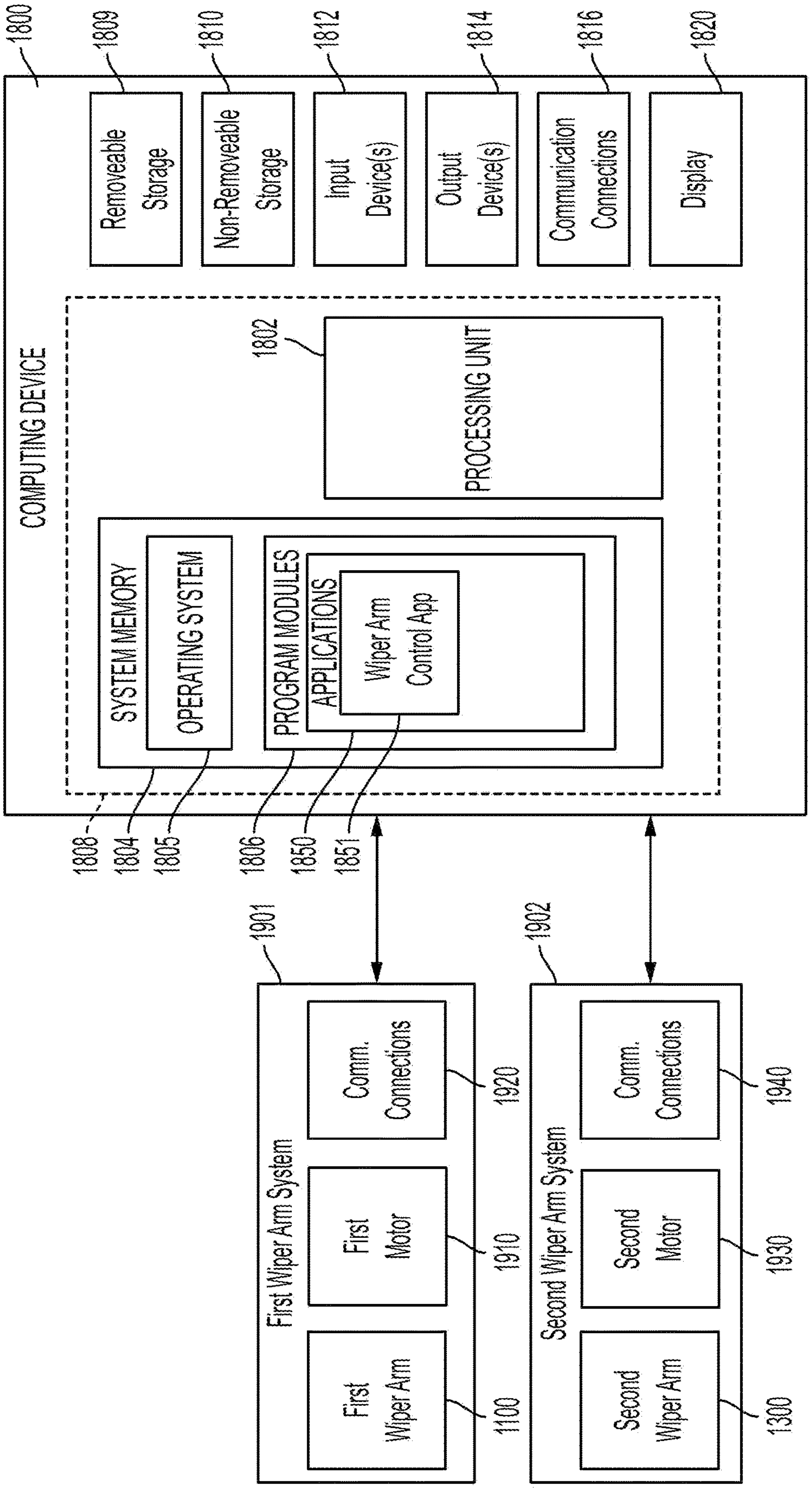
FIG. 6 depicts a block diagram illustrating components of a system used to control the first and second wiper arms of a vehicle according to some examples.

FIG. 6 depicts a block diagram illustrating components (e.g., hardware and software) of a system used to control the first and second wiper arms 1100 and 1300 of the vehicle 1000 of FIG. 1 according to some examples. The system includes a computing device 1800 operatively coupled to each of the first and second wiper arms 1100 and 1300, for example, via first and second wiper arm systems 1901 and 1902. In some examples, the computing device 1800 is separately (independently) operatively coupled to the first and second wiper arms 1100 and 1300 such that the computing device 1800 is configured to separately control movement of the first and second wiper arms 1100 and 1300. For example, the first wiper arm system 1901 may include the first wiper arm 1100, a first motor 1910 configured to control movement of the first wiper arm 1100, and communication connections 1920, and the second wiper arm 1902 may include the second wiper arm 1300, a second motor 1930 configured to control movement of the second wiper arm 1300, and communication connections 1940. The computing device 1800 may be configured to separately control the first and second motors 1910 and 1930 to thereby separately control the first and second wiper arms 1100 and 1300. The computing device 1800 may be operatively coupled to the first and second motors 1910 and 1920 via respective wired connections or respective wireless connections, such as Bluetooth connections. For example, the computing device 1800 may be configured to transmit operating signals to the first and second motors 1910 and 1930 respectively via the communication connections 1920 and 1940.

The computing device 1800 may be any computing device suitable to be used for controlling the first and second wiper arms 1100 and 1300. In a basic configuration, the computing device 1800 may include at least one processing unit 1802 (e.g., a processor) and a system memory 1804. Depending on the configuration and type of computing device, the system memory 1804 may comprise, but is not limited to, volatile storage (e.g., random access memory), non-volatile storage (e.g., read-only memory), flash memory, or any combination of such memories. The system memory 1804 may include an operating system 1805 and one or more program modules 1806 suitable for running software applications 1850, such as wiper arm control applications 1851. The wiper arm control application 1851 may include instructions that, when executed by the processing unit 1802, cause the system to perform operations described herein for controlling the first and second wiper arms 1100 and 1300. Furthermore, aspects of the invention may be practiced in conjunction with a graphics library, other operating systems, or any other application program and is not limited to any particular application or system. This basic configuration is illustrated in FIG. 6 by those components within a dashed line 1808. The computing device 1800 may have additional features or functionality. For example, the computing device 1800 may also include additional data storage devices (removable and/or non-removable) such as, for example, magnetic disks, optical disks, or tape. Such additional storage is illustrated in FIG. 6 by a removable storage device 1809 and a non-removable storage device 1810.

As stated above, a number of program modules and data files may be stored in the system memory 1804. While executing on the processing unit 1802, the program modules 1806 may perform processes including, but not limited to, one or more of the stages or operations of the methods described herein. Other program modules that may be used in accordance with examples of the present invention and may include applications such as controlling other operations of the vehicle 1000 besides controlling the first and second wiper arms 1100 and 1300. For example, the applications may include applications for controlling an engine of the vehicle 1000, an air conditioning system of the vehicle 1000, an alarm system of the vehicle 1000, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. Examples of the present disclosure may also be practiced using other technologies capable of performing logical operations such as, for example, AND, OR, and NOT, including but not limited to mechanical, optical, fluidic, and quantum technologies. In addition, aspects of the invention may be practiced within a computer or in any other circuits or systems.

The computing device 1800 may also have one or more input device(s) 1812 such as a keyboard, a sound input device, a touch input device, etc. A person (e.g., the vehicle's driver) may be able to activate the first and second wiper arms 1100 and 1300 and/or select a mode of operation of the first and second wiper arms 1100 and 1300 via the one or more input device(s) 1812. The computing device 1800 may include a display 1820 and may also include other output device(s) 1814 such as speakers, etc. The aforementioned devices are examples and others may be used. The computing device 1800 may include one or more communication connections 1816 allowing communications with other computing devices of the vehicle 1000 or outside of the vehicle (e.g., a server). For example, the computing device 1800 may be communicatively and/or operatively connected to the first and second wiper arm systems 1901 and 1902 via the communication connections 1816, 1920, and 1940. Examples of suitable communication connections 1816, 1920, and 1940 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1804, the removable storage device 1809, and the non-removable storage device 1810 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1800. Any such computer storage media may be part of the computing device 1800. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Referring to FIGS. 2, 5, and 6, the processor 1802 may be configured, when executing instructions stored in the system memory 1804, to perform a method including causing each of the first and second wiper arms 1100 and 1300 to move through one or more cycles. A cycle of the first wiper arm 1100 may include the first wiper arm 1100 rotating from the inner position to the outer position, and then rotating from the outer position back to the inner position. A cycle of the second wiper arm 1300 may include the second wiper arm 1300 rotating from the inner position to the outer position, and then rotating from the outer position back to the inner position.

The method may include causing the first and second wiper arms 1100 and 1300 to move through their respective cycles at the same frequency. The method may include causing the first and second wiper arms 1100 and 1300 to move through their respective cycles out-of-sync from one another. In some examples, the method includes causing the first and second wiper arms 1100 and 1300 to begin to move from their respective inner positions toward their respective outer positions at different times, and the method may include causing the first and second wiper arms 1100 and 1300 to begin to move from their respective outer positions toward their respective inner positions at different times. For example, when the first and second wiper arms 1100 and 1300 are in their respective inner positions, the second wiper arm 1300 may begin to move from its inner position toward its outer position before the first wiper arm 1100 begins to move from its inner position to its outer position. And the first wiper arm 1100 may begin to move from its outer position back toward its inner position before the second wiper arm 1300 begins to move from its outer position back toward its inner position.

In some examples, the method includes causing the first and second wiper arms 1100 and 1300 to move from their inner positions to their outer positions concurrently, such that there is a period of time when both of the first and second wiper arms 1100 and 1300 are simultaneously moving from their inner positions to their outer positions. For example, the second wiper arm 1300 may begin to move from its inner position towards its outer position before the first wiper arm 1100 begins to move from its inner position towards its outer position, and the first wiper arm 1100 may begin to move from its inner position towards its outer position while the second wiper arm 1300 is still moving towards its outer position.

In some examples, the method includes causing the first and second wiper arms 1100 and 1300 to move from their outer positions to their inner positions concurrently, such that there is a period of time when both of the first and second wiper arms 1100 and 1300 are simultaneously in motion from their outer positions to their inner positions. For example, the first wiper arm 1100 may begin to move from its outer position towards its inner position before the second wiper arm 1300 begins to move from its outer position towards its inner position, and the second wiper arm 1300 may begin to move from its outer position towards its inner position while the first wiper arm 1100 is still moving towards its inner position.

Because the first and second wipe areas 1610 and 1620 may overlap as described herein with reference to FIG. 5, operating the first and second wiper arms 1100 and 1300 in an out-of-sync manner can prevent the first and second wiper blades 1200 and 1400 from colliding with each other when they are moving outwardly or moving inwardly. For example, in a comparison example where the first and second wiper arms are both in their respective inner positions and both simultaneously begin to rotate outwardly towards their respective outer positions, the first and second wiper blades could collide. Similarly, in this comparison example, if the first and second wiper arms simultaneously begin to rotate inwardly from their outer positions towards their respective inner positions, the first and second wiper blades could collide.

Additionally, by moving the first and second wiper arms 1100 and 1300 outwardly from their inner positions toward their outer positions in a concurrent manner, and inwardly from their outer positions toward their inner positions in a concurrent manner, the visibility through the entire wipe area 1600 may be more uniform than if the first and second wiper arms 1100 and 1300 did not move concurrently. For example, during a full cycle, each of the first and second wiper arms 1100 and 1300 will twice wipe through their corresponding first and second wipe areas 1610 and 1620: once when moving outwardly from their inner positions to their outer positions and again when moving inwardly from their outer positions to their inner positions. By moving the first and second wiper arms 1100 and 1300 concurrently, the first and second wipe areas 1610 and 1620 may be substantially wiped together (either when the first and second wiper arms 1100 and 1300 concurrently move outwardly or concurrently move inwardly) such that the entire wipe area 1600 has a substantially uniform amount of precipitation, debris, and/or other visual obstructions across it (e.g., across the first and second wipe areas 1610 and 1620).

In contrast, in a comparison example where the first and second wiper arms 1100 and 1300 do not move concurrently, the second wiper arm 1300 may move from its inner position to its outer position, then the first wiper arm 1100 may move from its inner position to its outer position, then the first wiper arm 1100 may move from its outer position to its inner position, and then the second wiper arm 1300 may move from its outer position to its inner position. However, in this comparison example, the entire second wipe area 1620 is wiped before the first wipe area 1610 is wiped at all, and the entire first wipe area 1610 is wiped the second time before the second wipe area 1620 is wiped at all the second time. This can cause different levels of precipitation, debris, and/or other visual obstructions to exist in the first and second wipe areas 1610 and 1620, which can be distracting and potentially dangerous for the vehicle's driver, for example, during a rainstorm.

Although specific examples are described herein, the scope of the technology is not limited to those specific examples. Moreover, while different examples may be described separately, such examples may be combined with one another in implementing the technology described herein. One skilled in the art will recognize other examples or improvements that are within the scope and spirit of the present technology. Therefore, the specific structure, acts, or media are disclosed only as illustrative examples. The scope of the technology is defined by the following claims and any equivalents therein.

What is claimed is:

1. A vehicle, comprising:

a windshield;

a first wiper arm comprising a first segment and a second segment attached to the first segment; and a second wiper arm comprising a third segment and a fourth segment attached to the third segment, wherein the first wiper arm is operatively attached to the vehicle at a first side of the vehicle such that the first wiper arm is rotatable about a first axis of rotation between at least an outer position and an inner position, wherein the first wiper arm is shaped such that, when the first wiper arm is in the outer position, the first segment extends from the first axis of rotation away from a width center of the vehicle, and the second segment extends from the first segment at least partly along a height direction of the vehicle, wherein the second wiper arm is operatively attached to the vehicle at a second side of the vehicle opposite to the first side of the vehicle such that the second wiper arm is rotatable about a second axis of rotation between at least an outer position and an inner position, and wherein each of the first and second axes of rotation extends partly inwardly toward a width center of the vehicle while extending rearwardly toward a rear of the vehicle.

2. The vehicle of claim 1, wherein the first wiper arm is shaped such that, when the first wiper arm is in the inner position, the first segment extends from the first axis of rotation at least partly along the height direction, and the second segment extends from the first segment toward the width center of the vehicle.

3. The vehicle of claim 1, wherein the first segment comprises a first part extending from the first axis of rotation along a first axis, and a second part extending from the first part to a distal end of the first segment along a second axis that forms an angle with the first axis of at least 60 degrees, and wherein the second segment is attached to the distal end of the first segment.

4. The vehicle of claim 1, wherein the second segment is attached to the first segment by a hinge that applies a torque to the second segment relative to the first segment.

5. The vehicle of claim 1, wherein the windshield is a convex windshield that curves at least partially around a virtual axis that is parallel to the height direction and is positioned rearward relative to the windshield along a length direction of the vehicle extending from a front of the vehicle to a rear of the vehicle.

6. The vehicle of claim 1, wherein the second wiper arm is shaped such that, when the second wiper arm is in the outer position, the first segment of the second wiper arm extends from the second axis of rotation away from the width center of the vehicle, and the second segment of the second wiper arm extends from the first segment of the first wiper arm at least partly along the height direction.

7. The vehicle of claim 6, further comprising a vehicle control system comprising:

a processor operatively coupled to the first and second windshield wiper arms; and a memory coupled to the processor and storing instructions that, when executed by the processor, cause the vehicle control system to perform a method, the method comprising:

causing the first wiper arm to rotate through a plurality of cycles at a set frequency, and causing the second wiper arm to rotate through a plurality of cycles at the set frequency and out-of-sync from the plurality of cycles of the first wiper arm.

8. The vehicle of claim 6, wherein the first and second wiper arms are shaped and sized to wipe, during a cycle of each of the first and second wiper arms, a wipe area of the windshield having an upper edge that is, at a width center of the windshield, separated from a lower edge of the windshield by at least 60% of a distance between the lower edge of the windshield and an upper edge of the windshield at the width center of the windshield.

9. A vehicle, comprising:

a windshield;

a first wiper arm operatively attached to the vehicle at a left side of the windshield such that the first wiper arm is rotatable about a first axis of rotation between at least an outer position and an inner position; and a second wiper arm operatively attached to the vehicle at a right side of the windshield such that the second wiper arm is rotatable between at least an outer position and an inner position, wherein the first and second wiper arms are shaped and sized to wipe, during a cycle of each of the first and second wiper arms, a wipe area of the windshield having an upper edge that is, at a width center of the windshield, separated from a lower edge of the windshield by at least 60% of a distance between the lower edge of the windshield and an upper edge of the windshield at the width center of the windshield, and wherein the first wiper arm comprises:

a first part extending from the first axis of rotation along a first axis; and a second part extending from the first part along a second axis that forms an angle with the first axis of less than 140 degrees.

10. The vehicle of claim 9, wherein the windshield is a convex windshield that curves at least partially around a virtual axis that is parallel to a height direction of the vehicle and is positioned rearward relative to the windshield along a length direction of the vehicle extending from a front of the vehicle towards a rear of the vehicle.

11. The vehicle of claim 10, further comprising a driver seat positioned at a width center of the vehicle.

12. The vehicle of claim 9, wherein the first and second axes of rotation are non-parallel to each other.

13. The vehicle of claim 12, wherein extensions of the first and second axes of rotation meet and form an angle of at least 20 degrees.

14. The vehicle of claim 9, further comprising a vehicle control system comprising:

a processor operatively coupled to the first and second windshield wiper arms; and a memory coupled to the processor and storing instructions that, when executed by the processor, cause the vehicle control system to perform a method, the method comprising:

causing the first wiper arm to rotate through a plurality of cycles at a set frequency, and causing the second wiper arm to rotate through a plurality of cycles at the set frequency and out-of-sync from the plurality of cycles of the first wiper arm.

15. The vehicle of claim 14, wherein the method comprises causing the first and second wiper arms to concurrently rotate from their respective inner positions to their respective outer positions, and to concurrently rotate from their respective outer positions to their respective inner positions.

16. A pair of wiper arms for a vehicle, the pair of wiper arms comprising:

a first wiper arm, comprising:

a first segment configured to rotatably attach to an axis of rotation at a proximal end of the first segment, wherein the first segment comprises a first part extending along a first axis from the proximal end of the first segment, and a second part extending along a second axis from the first part of the first segment to a distal end of the first segment, and a second segment attached to the distal end of the first segment, and configured to attach to a wiper blade at an inner side of the second segment; and a second wiper arm, comprising:

a third segment configured to rotatably attach to a vehicle about an axis of rotation at a proximal end of the third segment, wherein the third segment comprises a third part extending along a third axis from the proximal end of the third segment, and a fourth part extending along a fourth axis from the third part of the third segment to a distal end of the third segment, and a fourth segment attached to the distal end of the third segment, and configured to attach to a wiper blade at an inner side of the fourth segment, wherein a coordinate system is defined by an X-axis, a Y-axis, and a Z-axis, which are mutually orthogonal, wherein the first wiper arm is shaped such that, when the first axis extends from the proximal end of the first segment along an X-axis direction and the second axis extends from the first part of the first segment at least partly in a Y-axis direction, the inner side of the second segment faces at least partly in a negative Z-axis direction, and wherein the second wiper arm is shaped such that, when the third axis extends from the proximal end of the third segment along a negative X-axis direction and the fourth axis extends from the third part of the third segment at least partly in the Y-axis direction, the inner side of the fourth segment faces at least partly in the negative Z-axis direction.

17. The pair of wiper arms of claim 16, wherein the first and second axes respectively of the first and second parts of the first segment form an angle of at least 60 degrees, and the third and fourth axes respectively of the third and fourth parts of the third segment form an angle of at least 60 degrees.

18. The pair of wiper arms of claim 16, wherein the second segment is attached to the first segment by a first hinge that is configured to apply a torque to the second segment relative to the first segment and with respect to a first hinge axis of rotation that is within 30 degrees from being parallel to the X-axis when the first axis extends from the proximal end of the first segment along the X-axis direction, and wherein the fourth segment is attached to the third segment by a second hinge that is configured to apply a torque to the fourth segment relative to the third segment and with respect to a second hinge axis of rotation that is within 30 degrees from being parallel to the X-axis when the third axis extends from the proximal end of the third segment along the negative X-axis direction.

19. The pair of wiper arms of claim 16, wherein the first wiper arm is shaped such that, when the first and second axes of the first and second parts are positioned within an X-Y plane defined by the X-axis and the X-axis, a longitudinal axis of the second segment is substantially parallel to the second axis, and wherein the second wiper arm is shaped such that, when the third and fourth axes of the third and fourth parts are positioned within the X-Y plane, a longitudinal axis of the fourth segment is substantially parallel to the fourth axis.

* * * * *